J. O. Thornhill,
Inventor

By Geo. P. Kimmel
Attorney

UNITED STATES PATENT OFFICE.

JAMES O. THORNHILL, OF JELLE, MINNESOTA.

COTTON-CHOPPING MACHINE.

1,348,764.  Specification of Letters Patent.  Patented Aug. 3, 1920.

Application filed December 26, 1917. Serial No. 208,818.

*To all whom it may concern:*

Be it known that I, JAMES O. THORNHILL, a citizen of the United States, residing at Jelle, in the county of Beltrami and State of Minnesota, have invented certain new and useful Improvements in Cotton-Chopping Machines, of which the following is a specification.

This invention relates to improvements in cotton chopping machines and it is the dominant object of the invention to provide a cotton chopping machine which upon moving over a plurality of rows of plants will effectually chop the same, thus, insuring proper cultivation.

Another and equally important object of the invention is to provide a machine of the character mentioned, the cotton chopping mechanism of which can be adjusted with relation to the plants to be chopped thereby, hence, permitting the same to be chopped at the desired depth.

It is also an object of the invention to provide novelly constructed chopping blades, the same having a plurality of cutting edges adapted to be engaged with the oppositely disposed rows of cotton plants.

Other independent objects are to provide features of construction of portions of the machine which tend toward the attainment of the above aims irrespective of the relation in which they are used.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claim.

In the accompanying drawings wherein is shown one of various possible embodiments of my invention:—

Similar reference characters refer to similar parts throughout the several views of the drawings.

Figure 1:
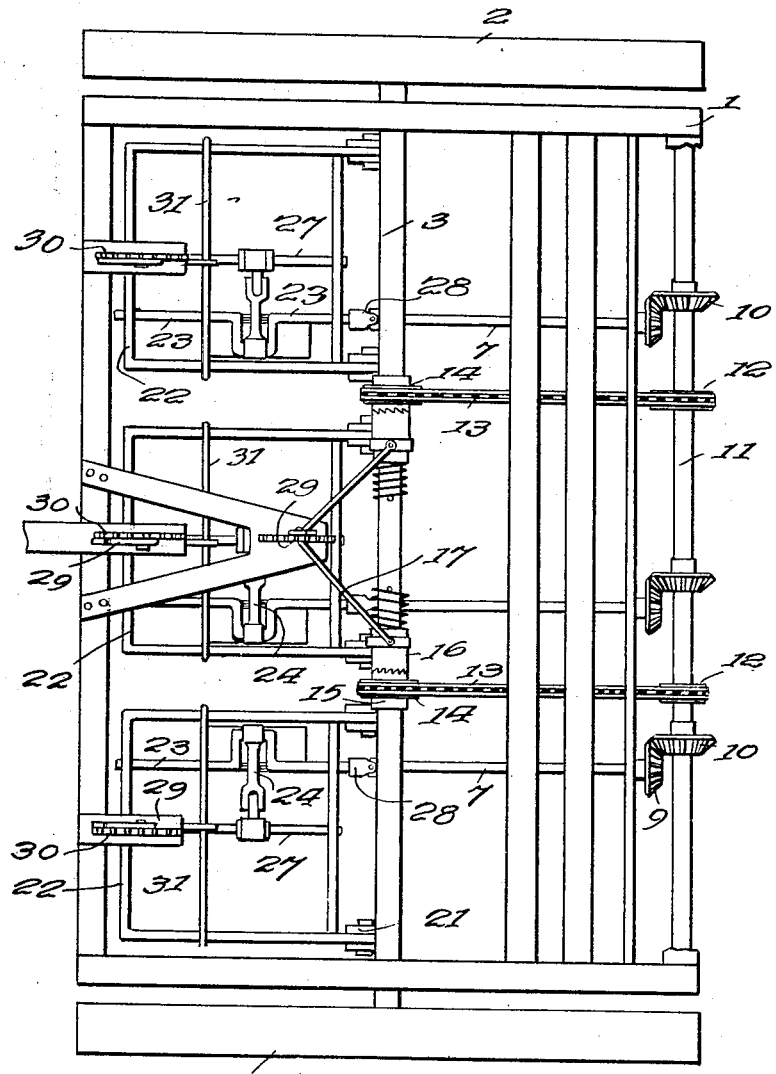
Figure 1 is a top plan of the improved machine.

Having more particular reference to the drawing, 1 represents the main frame of the improved machine, the same being provided with oppositely disposed wheels 2 mounted upon the extremities of a live axle 3 journaled in suitable bearings in said frame.

Figure 2:
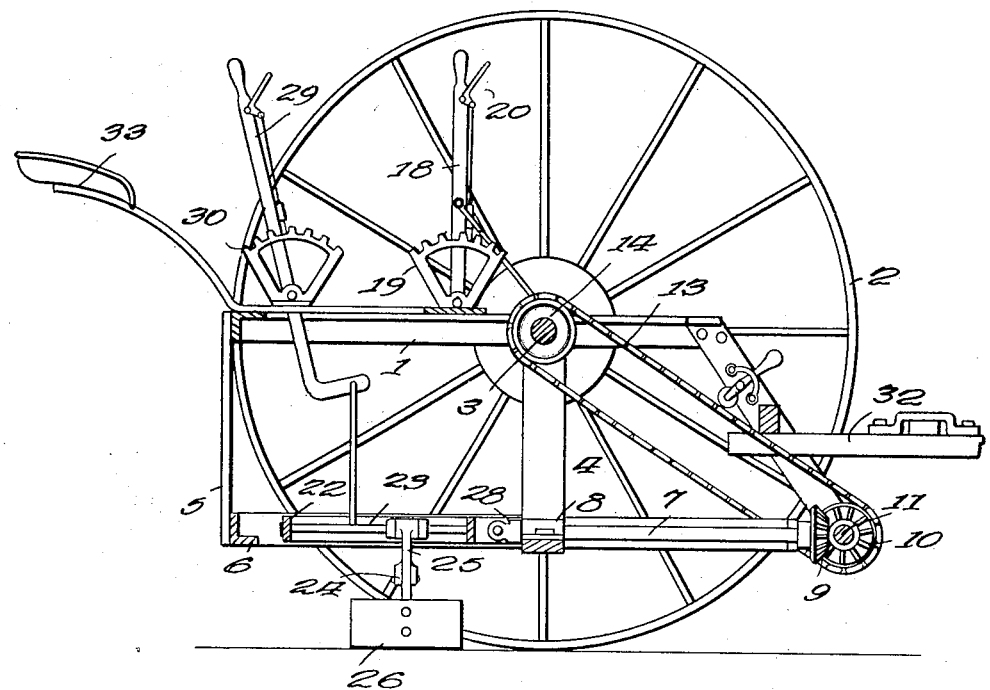
Fig. 2 is a vertical longitudinal section therethrough.
Figure 3:
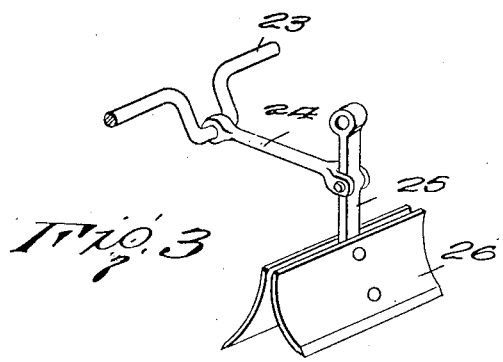
Fig. 3 is a detail in perspective of one of the chopping blades and the means for imparting motion thereto.

Depending brackets generally indicated by the numerals 4 and 5 are secured to the main frame in the manner as shown in the Fig. 2 and serve to support a secondary frame 6, which frame in turn, has a plurality of shafts 7 arranged longitudinally thereof and journaled in bearings 8. In this connection, it will be noted that the forward ends of the shafts 7 are provided with beveled gears 9 which constantly mesh with similar gears 10 carried upon a transversely disposed power transmitting shaft 11 journaled in bearings arranged in the opposite ends of the secondary frame 6. A plurality of sprocket wheels 12 are also mounted on the power transmitting shaft 11 and receive sprocket chains 13 thereabout, the opposite ends of these chains being received about other sprocket wheels 14 mounted on the live axle 3 by means of collars 15 which are loosely engaged therewith and have clutch elements formed on certain of the faces thereof, which clutch elements are adapted to be engaged by complemental clutch elements formed on the adjacent faces of other collars 16 splined to the said live axle and connected by links 17 to an operating lever 18, it being noted in this connection, that the said links are pivotally engaged with the operating lever. Hence, when the operating lever 18 is rocked forwardly the slidable clutch elements will be moved into engagement with the immovable clutch elements and as a consequence, motion will be imparted from the live axle 3 to the power-transmitting shaft 11 by way of the chains 13. When the lever is moved backwardly, the movable clutch elements 16 will be then brought out of engagement with the immovable clutch elements and as a consequence, the transmission of power to the shaft 11 will be discontinued. To permit the locking of the operating lever 18 in adjusted position, the usual quadrant 19 and slidable pawl 20 is provided; the quadrant, obviously, being mounted upon an adjacent portion of the main frame 1.

Pivotally engaged with brackets 21 carried by the secondary frame 6 are a plurality of substantially U-shaped frames 22, which as will be noted, have crank shafts 23 extending longitudinally of the same and journaled in suitable bearings thereon. To these various crank shafts 23 pitmen 24 are connected and have their outer ends bifurcated and pivotally engaged with the shank portions 25 of a chopping blade 26. The upper end of the shank is apertured and rotatably mounted on a longitudinally disposed rod 27 mounted on each of the U-shaped frames 22. It will be also understood, that each of the U-shaped frames 22 are provided with a cotton chopping blade 26. To permit the transmission of rotary motion to the crank shafts 23 by way of the shafts 7, the same are universally jointed thereto as at 28. Hence, relative movement of the crank shafts will be permitted.

In order that the chopping blades 26 may be adjusted vertically with relation to the plants to be chopped thereby, a plurality of levers generally indicated by the numeral 29 are mounted on the main frame 1 adjacent quadrants 30 and have substantially V-shaped connecting elements 31 engaged with their lower ends, while the free ends thereof are pivotally engaged with the opposite sides of the U-shaped frames 22. Obviously, upon rocking the levers 29 the U-shaped frames together with the chopping blades 26 carried thereby will be adjusted vertically to the desired extent with relation to the plants to be chopped. The chopping blades 26 may be effectually secured in adjusted position by engaging the slidable locking pawls carried by the levers 29 with the quadrants 30 adjacent the same.

The main frame 1 is of course provided with the usual draft connection 32 and operator's seat 33, the seat being supported upon the upper end of a spring standard.

In operation, when the machine is drawn over a field having rows of cotton plants growing thereon, the various chopping blades 26 are moved between the rows and due to the manner in which the same are connected with the power transmitting shaft 11, oscillatory motion will be imparted thereto and the opposite disposed cutting edges of the blades will be alternately engaged with the oppositely disposed rows of plants, thereby effectually chopping the same. The various chopping blades 26 may be adjusted vertically with relation to the plants to be chopped thereby, thus allowing the same to be cultivated to the proper depth. Further, should it be desired to discontinue the transmission of motion to the chopping blades 26, the lever 18 may be moved in a direction to cause disengagement of the movable clutch elements on the slidable collars 16 from the immovable clutch elements arranged on the collars 15.

Manifestly, the construction shown is capable of considerable modification and such modification as is within the scope of my claim, I consider within the spirit of my invention.

I claim:—

In a cotton chopper, a main frame having a live axle journaled therethrough for mounting traction wheels, an auxiliary frame hung to and below the main frame, a transverse drive shaft mounted on the auxiliary frame and operatively connected with the live axle carried by the main frame, a plurality of vertically swinging frames arranged side by side relative to each other transversely throughout the extent of the width of the auxiliary frame, crank shafts journaled longitudinally of the swinging frame, driven shafts disposed in longitudinal alinement with the crank shaft, universal joint connections between the alined shafts, said driven shafts operatively associated with the transverse drive shaft, chopping members swingably mounted in the auxiliary frames, crank rods connecting the crank shafts with the chopping members below their point of mounting, means for regulating the transmission of power from the live axle to the drive shaft, and means for vertically adjusting the swinging frames independently of each other to vary the depth of the cut made by the chopping members.

In testimony whereof I affix my signature hereto.

JAMES O. THORNHILL.